United States Patent [19] [11] 4,080,218
Mori et al. [45] Mar. 21, 1978

[54] METHOD OF REMOVAL OF NITROGEN OXIDES, PARTICULARLY FOR USE IN CEMENT RAW MATERIAL BURNING INSTALLATION

[75] Inventors: Hitoaki Mori, Tokyo; Zenzaburo Kawai, Kumagaya; Toshihiro Kobayashi, Tokyo; Yoshimi Yamamoto, Higashi-Kurume, all of Japan

[73] Assignees: Ishikawajima-Harima Jukogyo Kaisha; Tokushu Shunsetsu Kabushiki Kaisha, both of Tokyo, Japan

[21] Appl. No.: 704,985

[22] Filed: Jul. 13, 1976

[30] Foreign Application Priority Data

Jul. 23, 1975 Japan .................................. 50-89211

[51] Int. Cl.$^2$ ................................................. C04B 7/36
[52] U.S. Cl. .................................................... 106/100
[58] Field of Search ..................... 106/100; 432/19, 72; 423/235, 239

[56] References Cited

U.S. PATENT DOCUMENTS 3,900,554  8/1975  Lyon .................................... 423/235

Primary Examiner—J. Poer
Attorney, Agent, or Firm—Scrivener, Parker, Scrivener & Clarke

[57] ABSTRACT

The present invention discloses a method of removal of nitrogen oxides, particularly for the use in a cement raw material burning installation, said method comprising the step of introducing the reduction agent for the removal of nitrogen oxides into the zone, where is heated to about to 800° to 1,100° C of a duct connecting between a furnace such as a rotary kiln and the lowermost cyclone of a suspension type heater system, thereby removing nitrogen oxides produced in the burning furnace.

1 Claim, 1 Drawing Figure

U.S. Patent        March 21, 1978        4,080,218
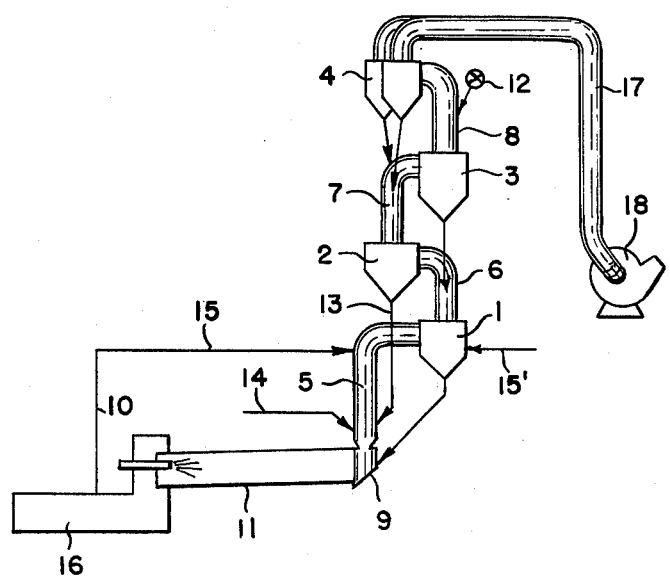

METHOD OF REMOVAL OF NITROGEN OXIDES, PARTICULARLY FOR USE IN CEMENT RAW MATERIAL BURNING INSTALLATION

DETAILED DESCRIPTION OF THE INVENTION

The present invention relates to a method of removal of nitrogen oxides (denitrification) produced in a rotary kiln for burning cement raw materials.

In general, the conventional methods of preventing the emission of nitrogen oxides into the surrounding atmosphere are divided into two major types. In one type the generation of nitrogen oxides themselves is suppressed by the improvements over the combustion technique, while in the other type nitrogen oxides once produced are converted through the reducing reaction into harmless gases.

These methods may be applied to an installation for burning cement raw materials in the following manners;

1. Use of a low-nitrogen-oxides burner

The term "low-nitrogen-oxides burner" refers to a burner of the type with which fuel combustion is conditioned so as to minimize the production of nitrogen oxides. According to the experiments of low-nitrogen-oxides burner conducted with a furnace in which combustion air of the ambient temperature is used, the production of nitrogen oxides was reduced from 20 to 30%. However in the rotary kiln for burning cement raw materials, the combustion air preheated to a temperature higher than 800° C is used so that a high temperature flame over 2000° C is formed. Therefore the above stated reduction in the concentration of nitrogen oxides could not be achieved in case of the cement rotary kiln even when the low-nitrogen-oxides burner is used.

2. Combustion under a low excess air factor

When the combustion is carried on in the rotary kiln under a low excess air factor such as 1.00 to 1.01 the concentration of nitrogen oxides can be effectively suppressed to a relatively low level such as 50 to 150 ppm (in terms of $O_2 = 10\%$). However by the slight draft variations fuel combustion in the rotary kiln may be carried out under the reducing atmosphere so that the circulation and concentration within the clinker burning installation of volatile substances such as alkali, chlorine, sulfur, etc., brought into the system with raw materials and fuel is promoted. Consequently a hard coating with a high concentration of alkali, compounds and/or double salt minerals adheres and grows intensively on the inner wall of the kiln and/or the preheater adjacent to the kiln, thereby adversely affecting the continuous operation. In addition, clinker burnt under the reducing atmosphere cannot exhibit high quality. Due to various disadvantages as described above, the excess air factor must be at least 1.04 to 1.10 and as a result the concentration of nitrogen oxides is inevitably increased to 150 to 300 ppm (in terms of $O_2 = 10\%$).

3. Use of denitrification equipment

In case that the denitrification equipment is installed after the burning process so as to remove nitrogen oxides in the exhaust gases, the concentration of nitrogen oxides can be considerably reduced. However the initial and operating costs are very expensive so that the provision of the denitrification equipment for industrial scale cement plant is not economical.

In view of the above, one of the objects of the present invention is to provide a method which can lower the concentration of nitrogen oxides in the exhaust gases from the process to a substantially harmless level and which can be economically applied for the industrial processes.

The method is characterized by a nitrogen oxide reduction zone provided with a burning process such as a rotary kiln provided with a suspension type preheater, thereby removing the nitrogen oxides produced in and discharged from the kiln.

The present invention will become more apparent from the following description taken in conjunction with the accompanying drawing, in which:

Single FIGURE is a schematic view of an arrangement adapted to carry out the method in accordance with the present invention.

Referring to the single FIGURE, four cyclones 1, 2, 3, and 4 and gas ducts 6, 7 and 8 connecting those cyclones 1 to 4 constitute a suspension type preheater of the conventional type. The gas duct 5 communicates the lowermost cyclone 1 and a kiln feed end housing 9 of a rotary kiln 11 so that combustion gases produced by a burner 10 at its discharge end are induced into the preheater.

Fine raw materials for cement are charged by a feeder 12 into the gas duct 8 and while they are suspended in the exhaust gases flowing upward and carried to the cyclone 4 through the duct 8, the heat of the exhaust gases is transferred to the raw materials. Then preheated raw materials are separated from the gases in the cyclone 4 and are charged into the gas duct 7 as indicated by the arrow. By the repetition of the similar heat treatments for three times the raw materials are further preheated, discharged from the cyclone 1 and sent into the rotary kiln 11 by way of feed end housing 9. In the rotary kiln 11 the raw materials are heated up to about 1,450° C to produce cement clinker. In the gas duct 5 connecting between the cyclone 1 and the kiln feed end housing 9, the fine raw material particles charged from the cyclone 2 through a raw material chute 13 with contact with the exhaust gases discharged from the rotary kiln 11 with a temperature of the 1000° − 1100° C so that part of calcium carbonate ($CaCO_3$), which is a major component of the raw materials, is decarbonated into calcium oxide (CaO). The temperature of the exhaust gases lead into the cyclone 1 after said heat exchange in the gas duct 5 is 800° − 850° C.

The aforementioned nitrogen oxide reduction zone provided by the process which is a feature of this invention must fulfill the following conditions:

1. It must eliminate the problems of coating formation which tend to be very likely caused in the reduced gas conditions.

2. It must keep a temperature at which the denitrification reaction may take place.

3. It must keep the atmosphere in which catalysts favorable to denitrification reaction exist.

In the burning process, the gas duct 5 was selected as a zone that can satisfy the above three conditions. Since raw material particles preheated to 800° to 850° C are distributed with a high concentration into the gases, most of all the volatile matters adhere to the raw materials so that no coating is formed on the duct walls even though the gases are maintained in a reducing condition. In addition, the denitrification reaction is rationally carried out at the temperature of 800° to 1100° C and the temperature zone just exists in the gas duct 5.

Furthermore, the calcium oxide (CaO) decarbonated, iron and iron oxides contained in the raw materials, act as very strong catalysts in the denitrification reaction.

Next the arrangement for satisfying the above conditions will be described in more detail hereinafter. In order to charge the reduction agent required for the denitrification reaction, the gas duct 5 is provided with a feed part 14 located adjacent to the opening on the gas duct 5 for the raw material chute 13 extended from the cyclone 2. The reduction agents will be either one of carbon (C), carbon monoxide (CO), hydrocarbon (HC), ammonia ($NH_3$), iron (Fe) and iron oxides or the combination thereof. Carbon monoxide or hydrocarbon may be obtained by feeding oil or pulverized coal through the feed part 14 and burning it in the gas duct 5.

In case combustion materials such as carbon, carbon monoxide, hydrocarbon, etc., have been used as the reduction agent, the remaining combustibles, if present, in the gas duct 5 after its nitrogen oxide reducing zone are burned by combustion air induced into the duct itself or the cyclone 1. It is advantageous in view of thermal economy that the pre-heated air in a clinker cooler 16 is induced through an air duct 15 as the combustion air. However when the amount of the induced air is relatively small, the surrounding air may be directly induced into either the cyclone 1 as indicated by the arrows 15' or into the duct 5. The heat thus developed by the combustion at the downstream of the said reducing zone in the duct 5 or in the cyclone 1 may be effectively utilized for calcining raw materials.

The removal of nitrogen oxides can be much facilitated if the reduction agents and catalysts are mixed positively into and dispersed evenly with the gases containing nitrogen oxide. For this purpose, therefore, it is preferable to design the duct 5 in such a way that a violent swirling flow or a turbulent vortex flow may be produced within the duct 5.

In the above explanation, the cement raw material charged into gas duct 8 has been used as a catalyst, but it will be understood that any other suitable catalysts such as iron oxides ($Fe_2O_3$, $Fe_3O_4$) may be additionally charged into the nitrogen oxide reduction zone in the duct 5.

Next some examples of the present invention will be described.

EXAMPLE I

The data to be described below was obtained from the experiments conducted in a laboratory. That is, a vertical reaction furnace 30 mm in diameter and 325 mm in length was packed with the cement raw materials having the same composition as that used in an industrial scale plant, and the mixture gases having the same conposition as that of the exhaust gases discharged from the rotary kiln and carbon monoxide (CO) gas were supplied separately into the experimental furnace. The following nitrogen oxides reduction rates were obtained when the proportion of (CO) gas to the oxygen contained in the mixture gases was varied. During the test the gas temperature was maintained at 900° C and SV value ($SV$ = Gas Flow rate/Volume of catalyst containing zone in furnace), at $2000 Hr^{-1}$:

| Ratio $CO/O_2$ at the inlet to the furnace | Nitrogen oxide reduction rates |
|---|---|
| 1.5 | 20% |
| 2.0 | 56% |
| 3.0 | 98% |

EXAMPLE II

The data of EXAMPLE II was obtained from the experiments conducted in an industrial-scale cement rotary kiln.

Heavy oil was used as a source of reduction agent; the nitrogen oxide reduction zone in which the raw material particles are suspended in the gases was maintained at 850° to 900° C: and the excess air factor at the outlet of the reduction zone was maintained at 1.00 to 1.03. 40 to 60% of nitrogen oxides produced in the rotary kiln were reduced by carbon monoxide transitionally produced in the course of combustion acting as the reduction agent and by calcium oxide and iron oxides in the raw materials acting as catalysts.

As described above, according to the present invention the nitrogen oxide reduction agents are charged into the reduction zone, which is in the duct connecting the burning furnace such as a rotary kiln and the lowermost cyclone of the suspension type preheater and is placed in the vicinity of its opening through which the raw materials are charged into said duct from the next lowermost cyclone of the preheater system, and which zone is maintained at 800° C to 1100° C: calcium oxide, iron and iron oxides in the raw materials are used as catalysts, whereby the nitrogen oxides produced in the furnace or kiln may be reduced and removed.

The method invented for reducing the emission of nitrogen oxides into the surrounding atmosphere can exhibit the following advantages as compared with the conventional methods.

1. The nitrogen oxide reducing zone may be provided at a suitable place within the cement raw material burning process. Therefore denitrification equipment which is expensive in view of initial and operation costs is not required to be installed additionally after the cement raw material burning process.

2. The reduction agents used in the present invention are inexpensive and yet the developed heat, in case of combustible agents, can be fully utilized for the calcining (decarbonizing) reaction of cement raw material. Therefore this method does not bring any additional heat consumption to the burning process.

3. The raw materials under processing are effectively used as catalysts for promoting the denitrification reaction. Therefore replacement of catalysts due to their deterioration by use which occurs with conventional denitrification equipment is not required, thereby saving the cost of catalysts.

4. It is not required to carry out fuel combustion with a low excess air factor in the rotary kiln in order to reduce the produced nitrogen oxides. Therefore the raw materials can be heated up and burned at really high temperature so that high quality clinker is produced and the coating problem which may be caused by the reducing atmosphere in the kiln can be avoided.

What is claimed is:

1. The method for removing nitrogen oxides from the exhaust gases produced in a rotary kiln for burning cement raw materials comprising introducing at least one nitrogen oxide reduction agent selected from the group consisting of carbon, carbon monoxide, or hydrocarbon into a zone containing the exhaust gases, intermixing preheated fine raw materials for cement clinker with said exhaust gases in said zone, maintaining the temperature of the raw materials in said zone in the range of 800° C to 1,100° C to produce catalysts to accelerate the reducing reaction of the nitrogen oxide agent and introducing combustion air into the mixture of exhaust gases, nitrogen oxide and preheated raw materials.

* * * * *

UNITED STATES PATENT OFFICE
CERTIFICATE OF CORRECTION

Patent No. 4,080,218  Dated March 21, 1978

Inventor(s) Mori, Hitoaki; Kawai, Kumagaya; Kobayashi, Toshihiro; and Yamamoto, Yoshimi It is certified that error appears in the above-identified patent and that said Letters Patent are hereby corrected as shown below:

Change the Assignees on the Patent as follows:

"Ishikawajima-Harima Jukogyo Kabushiki Kaisha and Chichibu Cement Kabushiki Kaisha, both of Tokyo, Japan".

Signed and Sealed this

Twenty-second Day of August 1978

[SEAL]

Attest:

RUTH C. MASON
Attesting Officer

DONALD W. BANNER
Commissioner of Patents and Trademarks